(12) United States Patent
Borg et al.

(10) Patent No.: US 8,019,693 B2
(45) Date of Patent: Sep. 13, 2011

(54) SYSTEMS AND METHODS FOR UTILIZING PRINTING DEVICE DATA IN A CUSTOMER SERVICE CENTER

(75) Inventors: Michael J. Borg, Boise, ID (US); Alysia F. Wurst, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3010 days.

(21) Appl. No.: 09/820,457

(22) Filed: Mar. 28, 2001

(65) Prior Publication Data

US 2002/0140976 A1 Oct. 3, 2002

(51) Int. Cl.
*G06Q 30/00* (2006.01)
*G06Q 10/00* (2006.01)

(52) U.S. Cl. ....... 705/346; 705/308; 358/1.15; 358/1.16

(58) Field of Classification Search .................. 340/442, 340/448; 399/109, 113; 705/1, 14, 346, 705/308; 358/1.15, 1.16
See application file for complete search history.

(56) References Cited

U.S. PATENT DOCUMENTS

| | | | | |
|---|---|---|---|---|
| 5,557,096 | A * | 9/1996 | Watanabe et al. | 235/492 |
| 5,907,600 | A * | 5/1999 | Fuller et al. | 379/106.01 |
| 5,971,592 | A * | 10/1999 | Kralj et al. | 700/225 |
| 6,029,031 | A * | 2/2000 | Yokomori et al. | 399/109 |
| 6,067,525 | A * | 5/2000 | Johnson et al. | 705/10 |
| 6,147,604 | A * | 11/2000 | Wiklof et al. | 340/572.1 |
| 6,233,408 | B1 * | 5/2001 | Allen | 399/8 |
| 6,271,643 | B1 * | 8/2001 | Becker et al. | 320/112 |
| 6,371,380 | B1 * | 4/2002 | Tanimura | 235/492 |
| 6,386,772 | B1 * | 5/2002 | Klinefelter et al. | 400/208 |
| 6,519,571 | B1 * | 2/2003 | Guheen et al. | 705/14 |
| 6,677,852 | B1 * | 1/2004 | Landt | 340/10.1 |
| 6,798,997 | B1 * | 9/2004 | Hayward et al. | 399/12 |
| 6,985,877 | B1 * | 1/2006 | Hayward et al. | 705/27 |

(Continued)

FOREIGN PATENT DOCUMENTS

CN 1235302 11/1999

(Continued)

*Primary Examiner* — Dean T Nguyen

(57) ABSTRACT

Systems and methods are described for collecting data in component memory of a printing device replaceable component and utilizing the data in a customer service center. A printing device records data related to the printing device, usage information, environment information, etc. in a memory tag of a replaceable component—such as a toner cartridge—used in the printing device. When the component is returned to the manufacturer for recycling, the information is retrieved from the memory tag and stored in a customer database. When a customer contacts the customer service center, a customer service operator accesses information related to the customer and to the printing device(s) used by that customer. Help screens, or menus, displayed to the operator are customized according to the product(s) owned by the customer and the environment within which the product is used. The operator immediately knows details about the customer, the printing device(s) used by the customer, how the customer uses the printing device(s), the customer's previous problems with the printing device(s), etc. The operator may also be able to access pre-determined solutions that the operator can provide to the customer, such as providing a free replacement cartridge if the customer has had a number of problems with the printing device, etc. The customer is thus saved the time and trouble of providing detailed information and the manufacturer can offer improved customer service to satisfy the customer.

15 Claims, 5 Drawing Sheets

U.S. PATENT DOCUMENTS

| | | | |
|---|---|---|---|
| 2002/0030100 A1* | 3/2002 | Katayanagi et al. | 235/380 |
| 2002/0030597 A1* | 3/2002 | Muirhead | 340/572.1 |
| 2002/0075145 A1* | 6/2002 | Hardman et al. | 340/442 |
| 2002/0147629 A1* | 10/2002 | Alsafadi et al. | 705/10 |
| 2002/0191998 A1* | 12/2002 | Cremon et al. | 400/76 |
| 2003/0035128 A1* | 2/2003 | Phillips et al. | 358/1.14 |

FOREIGN PATENT DOCUMENTS

| | | | |
|---|---|---|---|
| JP | 0-181968 | | 6/2000 |
| JP | 2000-181968 | | 6/2000 |
| JP | 2003-039783 | * | 2/2003 |
| JP | 2002-0067922 | * | 9/2003 |

* cited by examiner

SYSTEMS AND METHODS FOR UTILIZING PRINTING DEVICE DATA IN A CUSTOMER SERVICE CENTER

TECHNICAL FIELD

The systems and methods described herein relate generally to managing data collected from printing devices. More particularly, the systems and methods described herein relate to retrieving data from printing device components that have memory and utilizing the printing device data to provide improved customer service.

BACKGROUND

Initiatives to increase customer satisfaction and to provide continued improvement of consumer goods have compelled providers of those goods go to great lengths to collect feedback from consumers about the provider's product. One way in which providers gather information is by providing a warranty card with a product. The customer buys the product and then, hopefully, fills out the registration card with personal information as well as demographic information about the customer. When the provider receives the registration card, the information contained on the card is recorded and saved by the provider. In this way, a provider can easily reference the type and model of the product purchased by the customer.

Another way in which providers gather information about customers who use their products and the way in which customers use their products is by logging details of customer service calls made by the customer to the provider. This usually occurs when the customer is having problems with a product sold by the provider. When a customer calls a customer service center operator with a problem the customer is experiencing, the operator who takes the call can ask questions of the customer, such as how the product is being used, the environment the product is in, how much use the product gets, problems observed in the use of the product, etc. This information is stored in a database and is linked to the customer. Thereafter, when the customer calls, a history of dealings with the customer can be retrieved.

In addition, data related to similar items can be linked to each other and, among other things, a customer service operator can tell if there is a historical defect with a certain product owned by a calling customer. If so, then the operator can focus on that particular defect as a possible cause of the customer's problem. This type of cross-referencing of data regarding products increases efficiency and increases the probability that the customer will have the problem resolved to the customer's satisfaction.

Printing device manufacturers are in a similar situation to the one described above. A printer, for example, may be sold to a customer. The customer operates the printer for months or years and then encounters a problem. The customer contacts the customer service department of the manufacturer, where an operator takes the call and pulls up information about the printer using the customer's name or the printer serial number that were provided on a registration card. The customer service operator is thereby well informed as to the customer's situation and the printer's use history.

A problem in such a customer service system is that an operator who takes a call from a customer must rely on a sometimes long list of characterizing questions to determine: (a) the computing environment with which the customer is having a problem; (b) the kind of problem the customer is having; and (c) the mood of the individual. This may be frustrating to the customer or the customer may not know many of the answers to these questions. In the case of a customer who calls with a problem regarding a printer, the customer service operator may need to know information such as the printer serial number, the percentage of print jobs that use duplexing, the average page coverage per print job, the percentage of pages that are printed with black ink only, etc. Most customers will not know the answers to these types of questions.

Another problem for the manufacturer is that the manufacturer must rely on the skills of the customer service operator. The human factor is very crucial in a customer service environment and an operator who lacks the proper knowledge to quickly diagnose a problem is of great concern. Furthermore, customer service operators do not normally have the authority to take an action that is necessary to satisfy the customer, e.g., replacing a part, sending a service technician to the customer's site, giving the customer a free item or service, etc.

SUMMARY

The systems and methods for utilizing printing device data in a customer service center described herein provide improved ways in which a provider may service customers and customer complaints.

In the example of a customer purchasing a printer from a printer manufacturer, the initial data about the customer is received when the customer returns a registration card. A file or record for that customer is set up in a database maintained by the manufacturer. In the future, replaceable components for the printer, such as toner cartridges, are sold and delivered to the customer. The replaceable components include a memory tag, which is used to record data from the printer. When a toner cartridge is exhausted, the customer returns it to the manufacturer for recycling. When the manufacturer receives the cartridge, the data is retrieved from the memory tag on the toner cartridge and the data is stored in the database. Appropriate links to other customer records are established with the new data.

The memory tag on the toner cartridge collects virtually any type of data, such as the model number and serial number of the printer in which the cartridge is used, page coverage data, duplex usage data, number of pages printed by the printer, number of pages printed from the toner cartridges, etc. In addition to this data, the manufacturer may also test returned cartridges that are suspected of having faults or as part of a quality control measure. Data regarding reliability of the toner cartridge can be gained by this type of testing and may be added to the database and linked to customers who use the same type of toner cartridge.

Other data may also be stored in the database and linked to the customer. For example, certain rules that are to be followed in certain circumstances may be linked with certain users of specific products. Suppose that a manufacturer wishes to maintain a rule that if a customer has three or more problems with a certain printer within a specified period of time, a customer service operator is authorized to exchange the customer's printer for a different model at no charge to the customer. This "rule" is provided to the customer service operator on a screen tailored to the customer's situation, i.e., the product owned by the printer and the environment within which the customer uses the product. As a result, the operator does not have to take the time to track down a supervisor to make the decision. Taking these types of decisions out of the control of the customer service operator will result in more consistent service to the manufacturer's customers.

With such a system in place, a customer service operator can access all records linked to a customer when the operator receives a call from the customer. The operator immediately knows the environment in which the printer has been operating, the manner in which the printer has been used, previous problems the customer has experienced, problems other customers have experienced with a similar printer, actions the operator is authorized to take in response to the problem, etc. In this way, the customer can be better served so that the likelihood of retaining the customer is increased.

In addition, the system is configured to customize the help screens, or menus, pulled up by the customer service operator. This limits the information that the operator must wade through to get to the point of the customer's problem. For example, if the data retrieved from the database indicates that the customer owns a "Model 8500" printer and a "Model 8500" printer does not have a power switch, then the menu displayed to the operator does not include troubleshooting steps such as asking the customer to power off the printer and power it back up again. These kinds of business efficiencies improve the service that the customer receives.

BRIEF DESCRIPTION OF THE DRAWINGS

A more complete understanding of exemplary methods and arrangements of the invention may be had by reference to the following detailed description when taken in conjunction with the accompanying drawings wherein.

DETAILED DESCRIPTION

Figure 1:
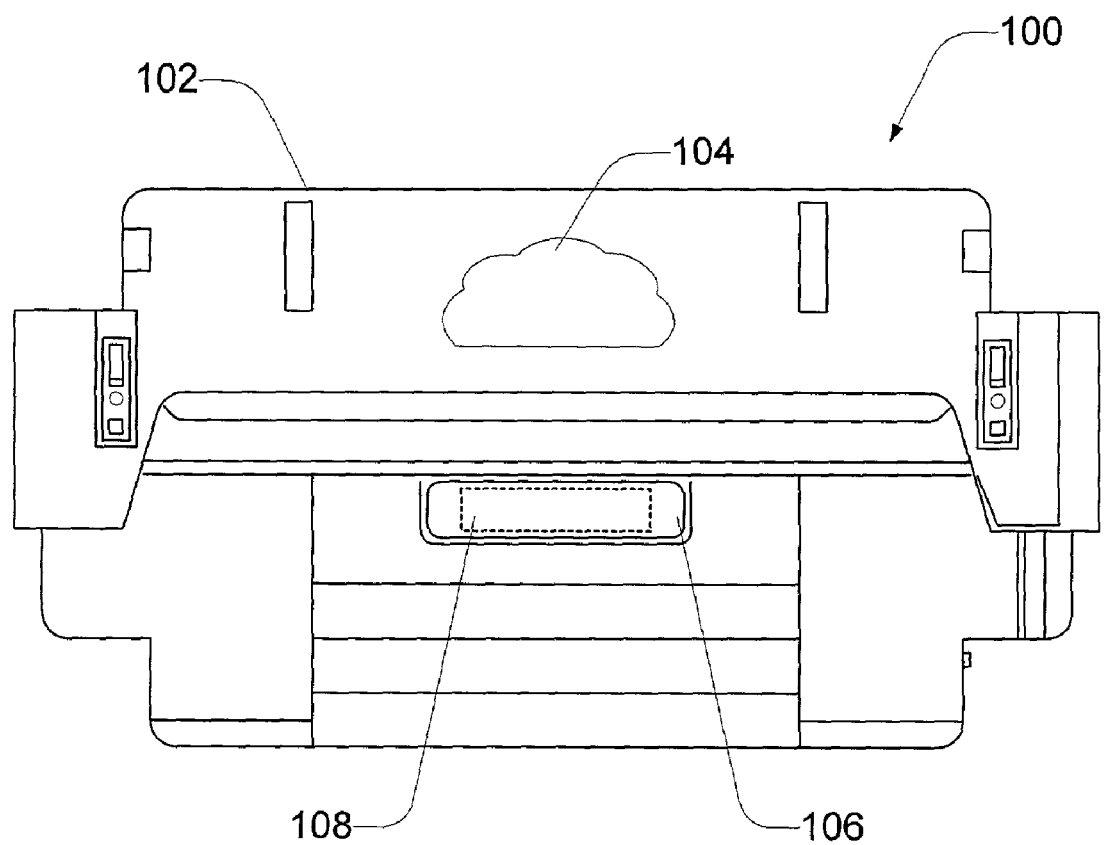
FIG. 1 is an illustration of a laser printer toner cartridge having integrated memory.

The invention is illustrated in the drawings as being implemented in a suitable computing environment. Although not required, the invention will be described in the general context of computer-executable instructions, such as program modules, to be executed by a computing device, such as a personal computer, a hand-held computer or portable electronic device. Generally, program modules include routines, programs, objects, components, data structures, etc., that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

General reference is made herein to one or more printing device. As used herein, "printing device" means any electronic device having data communications and data storage capabilities, and functions to render printed characters on a print medium. A printing device may be a printer, fax machine, copier, plotter, and the like. The term "printer" includes, but is not limited to, laser printers, ink jet printers, dot matrix printers, dry medium printers, copiers, facsimile machines and plotters. Although specific examples may refer to one or more of these printers, such examples are not meant to limit the scope of the claims or the description, but are meant to provide a specific understanding of the described implementations.

FIG. 1 is an illustration of a toner cartridge 100 that for a laser printer (not shown). The toner cartridge 100 is particularly suited for the present invention and includes a housing 102 and a toner reservoir 104 that may be filled with laser printer toner. The toner cartridge 100 also includes a label 106 that contains information identifying the toner cartridge 100 to a user. The label 106 typically recites the name of the manufacturer, the model number of the cartridge, etc.

A memory tag 108 is located underneath the label 106 on the toner cartridge 100, although the memory tag 108 may be placed on the toner cartridge 100 at any location that may be practical for the purposes described herein. The memory tag 108 is preferably a radio frequency identification (RFID) memory tag. RFID memory tags and applications therefor are well known in the art. Further aspects of the RFID memory tag 108 will become clear as the discussion progresses.

Figure 2:
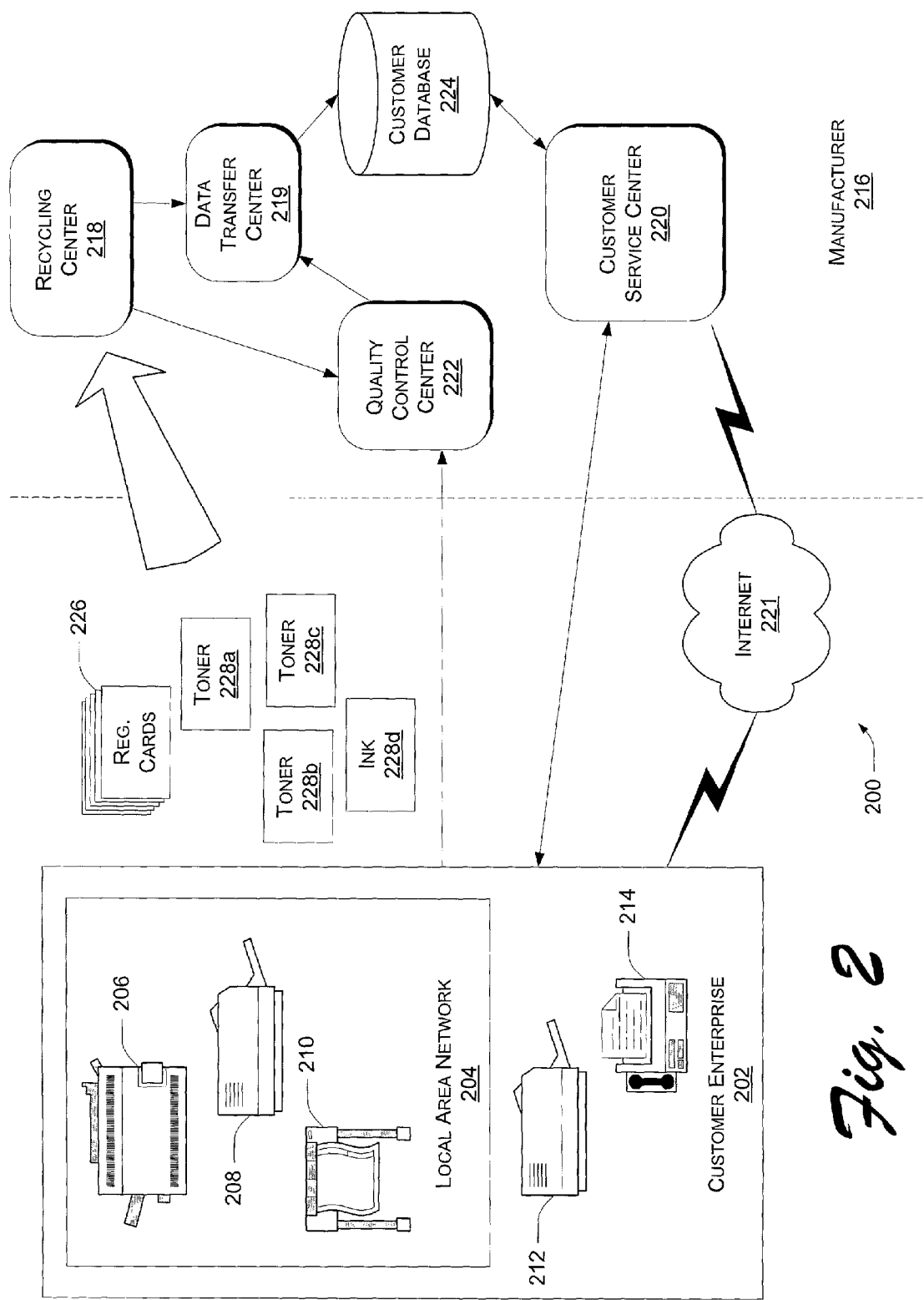
FIG. 2 is a depiction of a system for utilizing printing device data with a customer service center.

FIG. 2 is a diagram of an aggregation of systems 200 configured to employ the methods described herein. The systems 200 include a customer enterprise 202 that employs a local area network 204. The local area network 204 includes several computers (not shown) and printing devices, namely, laser printer 206, laser printer 208 and plotter 210. The customer enterprise 202 also includes laser printer 212 and fax machine 214 that are not a part of the local area network 204.

Although the customer enterprise 202 is shown having a local area network 204 and stand-alone printing devices, 212, 214, it is noted that any configuration of computers and printing devices that comprises at least one printing device may suffice for the purposes of the present invention. For example, the customer enterprise 202 could be a single person utilizing a single printing device. Or, the customer enterprise 202 could be a large enterprise having hundreds of computers and printing devices—networked and stand-alone. As the discussion progresses, it will be understood how one or more printing devices in the customer enterprise 202 can be utilized with the described methods.

The group of systems 200 also includes a manufacturer enterprise 216 that represents a manufacturer or vendor of printing devices and replaceable components for printing devices. The manufacturer enterprise 216 (or "manufacturer") includes a recycling center 218 that receives depleted replaceable components, such as toner cartridges, from customers for recycling. The manufacturer 216 also includes a customer service center 220, where one or more customer service operators answer calls from customers who have questions about manufacturer products or who have a problem with a printing device or replaceable component purchased from the manufacturer 216. In addition to connecting with customers via traditional communication means such as by telephone, the customer service center 220 communicates with the Internet 221. The customer enterprise 202 therefore can communicate with the customer service center 220 by way of the Internet 221.

The manufacturer enterprise has a quality control center 222 that receives depleted toner cartridges and other replaceable components from the recycling center 218 or directly from a customer experiencing problems. Depleted replaceable components are checked according to a schedule set by the manufacturer 216, such as every n$^{th}$ component, components that are suspected of having a higher than average defect rate, etc.

The manufacturer enterprise 216 maintains a customer database 224 that stores customer information including, but not limited to, personal data, demographic data, printing devices purchased by multiple customers, replaceable components purchased by the customers, etc. In addition, the customer database 224 stores usage information related to printing devices in which a customer utilizes a replaceable component that has been returned to the recycling center 218. Data is retrieved from memory of replaceable components at the recycling center 218 and the quality control center 222 and stored in the customer database 224 by way of a data transfer center 219.

The quality control center 222 also stores findings related to testing of returned components in the customer database 224. For instance, if a certain type toner cartridge has been found to have a high rate of defects, that information might be stored with customer information for customers who use that certain type of toner cartridge. In addition, if a customer purchases a toner cartridge that turns out to be defective and must be exchanged, that toner cartridge may be returned directly to the quality control center 222. The reason for doing so will be discussed in greater detail below.

When a printing device is sold by the manufacturer 216 to the customer enterprise 202 ("customer"), a registration or warranty card is included. The customer 202 fills out a registration card 226 for each printing device purchased by the customer 202. This information is stored in the customer database 224 and includes a customer identifier that uniquely identifies the customer, such as a customer name or customer number. Thereafter, any information stored in the customer database 224 that is related to the customer 202, printing devices owned by the customer 202, or replaceable components bought and/or returned by the customer are linked to the customer 202 by the customer identifier.

As the customer 202 uses toner cartridges 228a-228c, ink cartridges 228d, and other replaceable components, the cartridges 228a-228d are returned to the recycling center 218 of the manufacturer enterprise 216. The cartridges 228a-228d include a memory tag (FIG. 1, 108) integrated therewith or affixed thereto. Usage data from each printing device 206-214 is recorded in the memory of each cartridge 228a-228d as the printing device is operated with the cartridge installed. The recycling center 218 retrieves this data and stores the data in the customer database 224. Thereafter, the cartridges 228a-228d may be sent to the quality control center 222 for testing.

Figure 3:
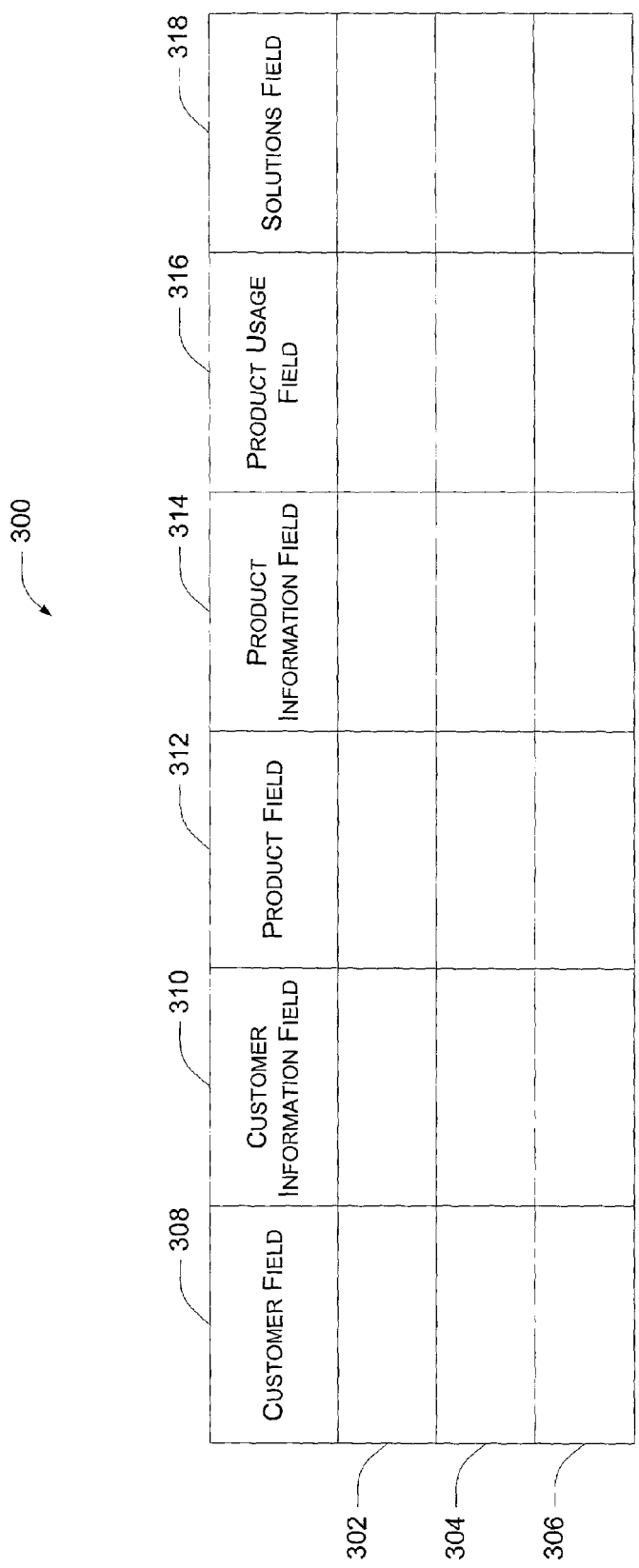
FIG. 3 is a representation of a customer database that stores data retrieved from memory of printing device replaceable components used in printing devices owned by several customers.

FIG. 3 is a representation of a customer database 300 that is similar to the customer database 224 shown in FIG. 2. The customer database 300 includes multiple records, represented as record 302, record 304 and record 306. Although only three records are shown, it should be understood that the customer database 300 may have virtually any number of records. Also, for discussion purposes, subsequent reference will be made only to record 302 as a matter of convenience. It should be understood that any feature included in record 302 is also included in record 304, record 306 and any other record that may be included in the customer database 300.

Record 302 includes a customer field 308, a customer information field 310, a product field 312, a product information field 314, a product usage field 316 and a solutions field 318. The fields shown in record 302 are exemplary only and it should be noted that more or less fields may be utilized to accomplish the purposes described herein.

The customer field 308 contains a value that uniquely identifies a customer in the customer database 300. The customer field 308 may contain a numerical value or an alphanumerical value, such as the customer's name. As long as the value contained in the customer field 308 can be used to uniquely identify a customer, any value may be used.

The customer information field 310 contains information related to the customer identified in the customer field 308. Such customer information may include customer-identifying information (e.g., name, address, telephone numbers, etc.) and/or it may contain a listing of all products purchased from the manufacturer by the customer. Furthermore, the customer information field 310 may be used to log telephone calls and/or other communications from the customer identified in the customer field 308. Virtually any information related to the customer identified in the customer field 308 may be stored in the customer information field 310. This way, when the record 302 is retrieved based in the customer field 308, the information contained in the customer information field 310 is also made available.

Record 302 also contains a product field 312 that contains a value that uniquely identifies a products purchased from the manufacturer by the customer identified in the customer field 308. For example, if the customer identified in the customer field 308 has purchased a printing device or a printing device component from the manufacturer, the model number, serial number, etc., may be stored in the product field 312. In addition, the product field 312 may include the date the printing device or component was purchased from the manufacturer.

A product information field 314 is also included in record 312. The product information field 314 contains information about a product identified in the product field 312. The product information may include specifications on the product, information on the continued production or availability of the product, common problems found in similar products made by the manufacturer, etc. The information contained in the product information field 314 provides immediate access to information that is not available to a customer. This can result in a faster diagnosis and resolution to a problem a customer is having with the product.

Record 302 also contains a product usage field 316. The product usage field 316 contains specific data gathered from the product identified in the product field 312. This information may include, but is not limited to, model and/or serial number of a printing device in which a replaceable component was used, number of pages printed by the printing device, percentage of black ink only jobs printed by the printing device, etc. Any printing device data that can be recorded and stored in the component memory of a replaceable component used in the printing device may be retrieved from the component memory and stored in the product usage field 316. Having access to this data helps a customer service operator quickly identify how a customer is using a product, and this can allow the operator to forego asking such questions of the customer and use the information in formulating a solution to the customer's problem.

Record 302 also includes a solutions field 318 that contains preauthorized measures that a customer service operator may take in response to certain problems a customer is experiencing. For example, if a call to the customer service center is the third call a customer has had to make regarding a printing device, the solutions field 318 may contain information that allows a customer service operator to send the customer a free toner cartridge. The information may also, for example, indicate that if a customer is using a product that has been proven to be defective, the customer service operator should recommend a replacement part of a different type that may not exhibit the same problem. Any information that can be predetermined so that a customer service operator does not have to take the time to have each individual situation evaluated and approved by a higher-level employee can be utilized in the solutions field 318.

Figure 4:
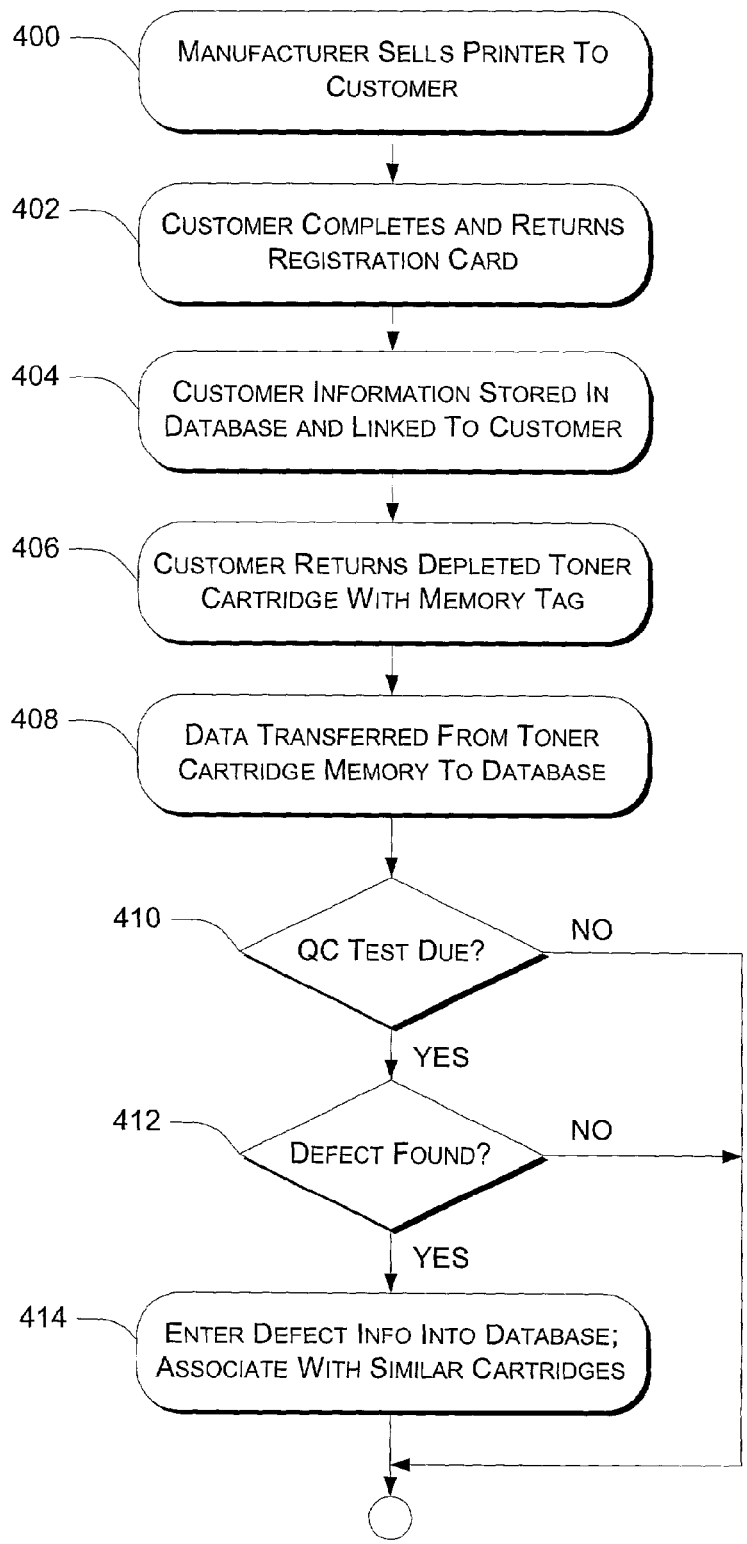
FIG. 4 is a flow diagram depicting a method for retrieving data from toner cartridge memory to store in a customer database.

FIG. 4 is a flow diagram of one way in which the data retrieved from recycled component memory may be utilized with a customer service operation. Continuing reference will be made to the elements and reference numerals of FIGS. 1-3 in the following discussion of FIG. 4 and FIG. 5.

At step 400, the manufacturer 216 sells a printer 206 (or some other printing device or printing device replaceable component) to the customer 202. The customer 202 completes a registration card 226 that is shipped with the printer 206 and returns the registration card 226 to the manufacturer 216 (step 402). Alternatively, some manufacturers provide a way in which a customer can register with the same information electronically, such as via the Internet. Any way in which the customer presents registration information to the manufacturer may be utilized. At step 404, the manufacturer 302 stores customer information from the registration card 226 in the customer database 224. The customer information includes a customer identifier that uniquely identifies the customer 202 within the customer database 224. All subsequent information entered into the customer database 224 that is related to the customer 202 or any printing device or replaceable component purchased by the customer 202 is associated with the customer identifier.

The printer 206 employs a toner cartridge 100 (or other replaceable component) that has a memory tag 108 affixed to the toner cartridge 100 or integrated into the toner cartridge 100. As the printer 206 operates, information related to the printer 206 and its usage is stored in the memory tag 108. This information may include printer identifying information, such as a model number of the printer 206, a serial number of the printer 206, etc. This information also includes printer usage data that includes, but is not limited to, total number of pages printed by the printer, number of pages printed from the toner cartridge 100, average amount of coverage on a page printed by the printer 206, percentage of print job that only use black ink, etc.

When the toner cartridge 100 runs out of toner, the customer 202 returns the depleted toner cartridge 100 to the manufacturer 216 for recycling at step 406. The recycling center 218 receives the toner cartridge 100 and, at step 408, retrieves the data from the memory tag 108 of the toner cartridge 100 and stores the data in the customer database 224.

The quality control center 222 determines at step 410 if the returned toner cartridge 100 should be tested, either because a defect is suspected in the toner cartridge 100 or because a quality control program in place requires that one in every pre-determined number of returned cartridges be tested. In addition, a customer may return a cartridge directly to the quality control center 222 if the customer has received a defective cartridge that is ultimately replaced by the manufacturer. If a quality control test is not due ("No" branch, step 410), then no further action is taken. If a quality control test is due ("Yes" branch, step 410) and a defect is found ("Yes" branch, step 412), the information regarding the defect found is entered into the customer database 224 at step 414. The information regarding the defect is linked to cartridges that are similar to the toner cartridge 100 in which the defect is found. In this way, if a customer is having a problem with a similar toner cartridge 100, an employee of the manufacturer can see that cartridges similar to one owned by the customer tend to have problems that may be similar to what the customer is experiencing. This can give the manufacturer lead-time in diagnosing the customer's problem. If no defect is found with the toner cartridge 100 ("No" branch, step 412), then no further action is taken.

Figure 5:
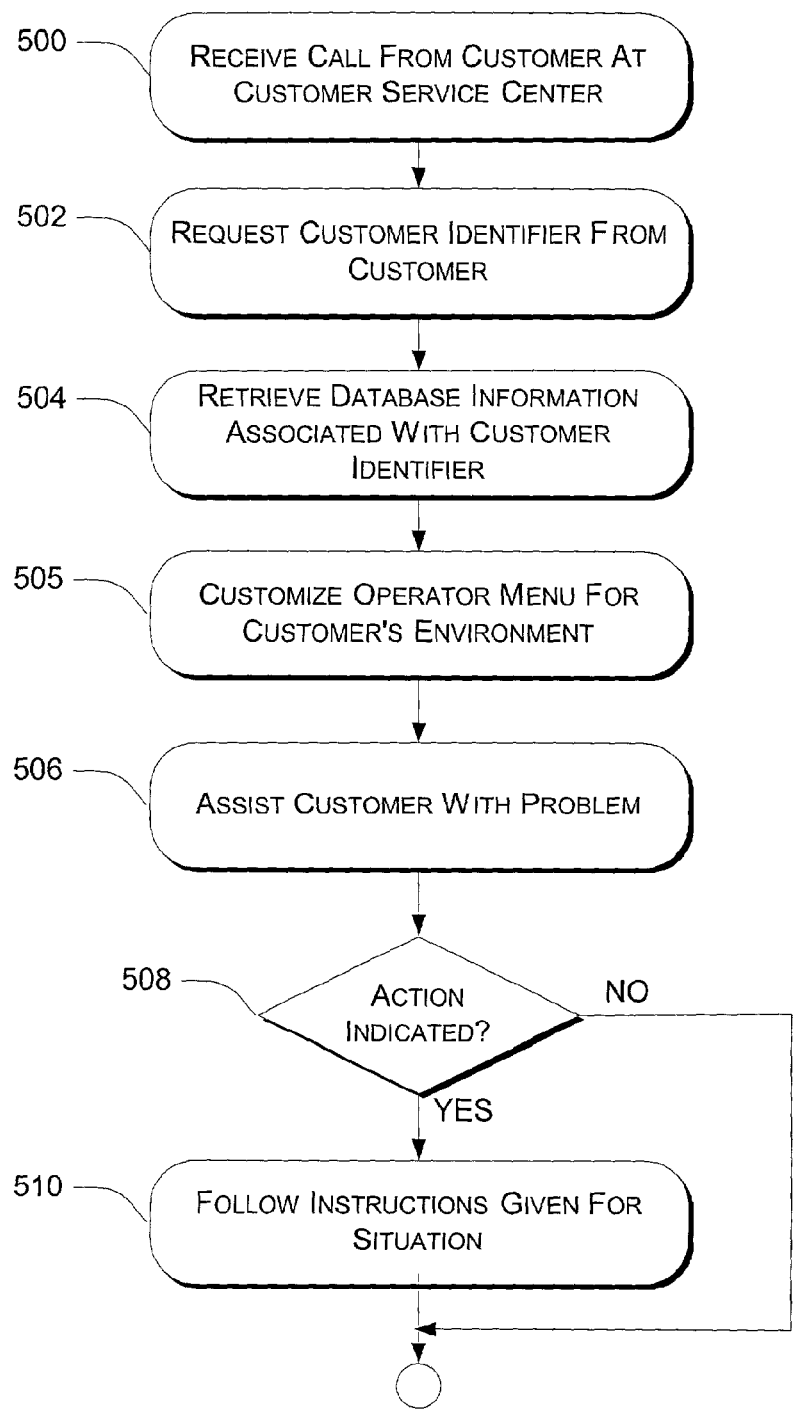
FIG. 5 is a flow diagram depicting a method for accessing a customer database that contains data from memory of a toner cartridge to assist with a customer service call.

FIG. 5 is a flow diagram of a method for accessing the customer database 224 to assist with a customer service call regarding a problem with a printing device or a component used in the printing device. At step 500, the customer service center 220 receives a call from a customer who has purchased a printing device or a printing device replaceable component from the manufacturer. The call is taken by a customer service operator at the customer service center 220, who requests a customer identifier from the calling customer (Step 502). The customer identifier may be the customer's name or a customer number. Any identifier that uniquely identifies the customer to the operator may be used.

At step 504, the customer service operator access the customer database 224 using the customer identifier. It is noted that the customer identifier given by the customer to the operator may not be the value that is used to access customer information in the customer database 224. If not, it may be necessary for the operator to perform a lookup that cross-references the customer identifier provided by the customer with a customer identifier that is used in the customer field 308 of the customer database 224. For purposes of this example, it is assumed that the customer identifier provided to the customer service operator is the same customer identifier used to identify the customer in the customer database 224.

At step 505, the information obtained from the customer database 224 is used to develop customized menus, or help screens, that are displayed to the customer service operator for a specific customer. The customized menus are developed according to the product(s) owned by the customer and the environment within which the customer uses the product(s). For example, suppose a customer owns a "Model 8500" printer and that a "Model 8500" printer does not have a power switch on it. In this case, the menu would be customized to omit any references to a power switch. For instance, typical troubleshooting instructions might have the operator ask the customer to power the printer off and then on again. Since the customer's printer, in this case, does not have a power switch, such an instruction would be omitted. Hence, the instructions provided to the operator would be "streamlined" to conform to the customer's equipment and environment. This helps the operator to get to the heart of the customer's problem more quickly and provides a better experience for the customer.

Once the customer service operator has accessed information related to the customer and/or the customer's product, the operator can assist the customer with the problem experienced by the customer (step 506). For discussion purposes, assume that the customer is having problems with a laser printer purchased from the manufacturer and that the customer has returned one or more spent toner cartridges from which data has been retrieved and stored in the customer database 224.

By having access to the customer database 224, the operator has immediate customized information regarding the customer's product, when it was purchased, what products it is used with, how the product is used, etc. This can provide the operator with information that allows the operator to make informed decisions about the product and the problems presented by the customer. This also allows the manufacturer to customize menus for efficiency. For example, the operator may see that the cartridge used by the customer has been found to have an unusually high rate of defects and, therefore, the problem the customer is seeing may be due to a defective cartridge. The operator can also see how the product is being used, such as whether unusually high usage of the product may be causing problems.

The operator also has the opportunity to view information about previous calls the customer has made to the customer service center 220. If this is the third time the customer has called with the same problem, the operator is immediately put on notice that the customer may be impatient to resolve the problem this time. Notes on the customer's demeanor in previous calls may also put the operator on alert to take special care with certain customers.

At step 508, the operator determines if an action is indicated for the customer's problem. This is done by accessing the solutions field 318 of customer records 302-306 in the customer database 224. For example, if this is the third time the customer's printer has gone down within the first month after it was purchased, the solutions field 318 may pre-authorize the operator to replace the customer's printer ("Yes" branch, step 508). In that case, the instructions shown in the solutions field are followed at step 510. If, however, no immediate solution is authorized ("No" branch, step 508), then the operator must continue to work with the customer.

Another example is in a case where a toner cartridge may have exhibited too many defects and may have been superceded by a new toner cartridge. The solutions field 318 may indicate that the operator should immediately offer to send the customer a new toner cartridge that will work better than the customer's current toner cartridge. Providing this type of pre-authorization to customer service operators can save valuable time and money, both for the customer and the manufacturer.

CONCLUSION

The systems and methods described herein provide convenient, efficient ways for providing customer service to customers who own printing devices or replaceable components used in printing device. Valuable information is gathered from the customer without the customer having to take time to provide the information. The information is compiled and available to a customer service operator to assist the operator in resolving a problem experienced by the customer. In addition, customer and manufacture time is saved by providing pre-determined solutions that can be used in certain circumstances. This allows a customer service operator to provide immediate solutions to the customer, without having to first go through a lengthy bureaucratic process. In the end, the customer is more satisfied with the service provided by the manufacturer, and the manufacturer is able to retain more customers.

The invention claimed is:

1. A method, comprising:
   receiving a replaceable printing component from a customer, the replaceable printing component previously installed in a printing device of the customer;
   retrieving printing device data from component memory of the replaceable printing component, the printing device data comprising one or more of identification information or usage information of the printing device in which the replaceable printing component was previously installed;
   storing the printing device data in a customer database and associating the printing device data with a customer record of the customer;
   accessing the printing device data in the customer database; and
   assisting a customer with solving problems related to the printing device by way of the printing device data.

2. The method as recited in claim 1, wherein the receiving a replaceable printing component from a customer further comprises receiving the replaceable printing component after the replaceable printing component has been depleted.

3. The method as recited in claim 1, wherein the assisting a customer with solving problems related to the printing device further comprises customizing solutions for the customer based on the printing device data.

4. The method as recited in claim 1, wherein the accessing the printing device data in the customer database further comprises accessing previously stored database information related to the customer.

5. The method as recited in claim 4, further comprising:
   deriving the previously stored database information from component memory of previously returned replaceable printing components.

6. The method as recited in claim 4, further comprising:
   deriving the previously stored database information from information submitted by the customer on a registration card.

7. The method as recited in claim 1, wherein the printing device is a laser printer and the replaceable printing component is a toner cartridge.

8. The method as recited in claim 1, further comprising following certain rules when printing device data associated with a customer meets certain criteria.

9. The method as recited in claim 1, further comprising:
   testing the replaceable printing component for a defect;
   finding the defect and storing defect information of the defect in the customer database;
   associating the defect information to one or more other customers of the customer database that use a similar replaceable printing component; and
   wherein the accessing the printing device data further comprises accessing the defect information in the customer database.

10. A method comprising:
    retrieving printing device data from component memory of a plurality of replaceable printing components previously installed in printing devices, the printing device data comprising one or more of identification information or usage information of the printing devices in which the replaceable printing components were previously installed;
    compiling the printing device data into a customer database;
    accessing the printing device data of the customer database; and
    assisting a customer with resolving a problem with a printing device using the printing device data of the customer database.

11. The method as recited in claim 10, further comprising storing customer information for a customer in the customer database and associating the customer information with compiled data that is related to a printing device used by the customer.

12. The method as recited in claim 11, further comprising acquiring the customer information for the customer from a registration card used to register the customer as the purchaser of the printing device used by the customer.

13. The method as recited in claim 11, further comprising associating the customer information with general data related to a printing device or printing device replaceable component used by a customer.

14. A method, comprising:

receiving a used replaceable printing component from a customer;

retrieving printing device data from component memory of the used replaceable printing component, the printing device data comprising one or more of identification information or usage information of a printing device in which the used replaceable printing component was used;

storing the printing device data in a customer database and associating the printing device data with a customer record of the customer;

accessing the printing device data of the customer database; and assisting a customer with resolving a problem with a printing device using the printing device data of the customer database.

15. A method, comprising:

after removal of a replaceable printing component from a printing device, retrieving printing device data from component memory of the replaceable printing component, the printing device data comprising one or more of identification information or usage information of the printing device from which the replaceable printing component was removed;

storing the printing device data in a database;

accessing the printing device data of the database; and assisting a customer with resolving a problem with a printing device using the printing device data of the database.

* * * * *